United States Patent
Bauduin et al.

(10) Patent No.: US 6,297,309 B1
(45) Date of Patent: Oct. 2, 2001

(54) HOT-MELT PRESSURE-SENSITIVE ADHESIVE FOR HYGIENE APPLICATIONS

(75) Inventors: Francois Bauduin, Compiegne; Thierry Dreyfus, Margny-les-Compiegne; Catherine Godec, Chevincourt, all of (FR)

(73) Assignee: Elf Atochem S.A. (FR)

( * ) Notice: Subject to any disclaimer, the term of this patent is extended or adjusted under 35 U.S.C. 154(b) by 0 days.

(21) Appl. No.: 09/043,672

(22) PCT Filed: Sep. 13, 1996

(86) PCT No.: PCT/FR96/01424

§ 371 Date: Oct. 2, 1998

§ 102(e) Date: Oct. 2, 1998

(87) PCT Pub. No.: WO97/12007

PCT Pub. Date: Apr. 3, 1997

(30) Foreign Application Priority Data

Sep. 26, 1995 (FR) .................................................. 95 11252

(51) Int. Cl.$^7$ .................................................. C08J 123/08
(52) U.S. Cl. .................... 524/476; 524/481; 524/483; 524/487; 524/489; 524/490; 604/358; 604/366
(58) Field of Search .................... 524/476, 481, 524/483, 487, 488, 489, 490; 604/358, 366

(56) References Cited

U.S. PATENT DOCUMENTS

| | | | |
|---|---|---|---|
| 4,338,227 | * 7/1982 | Ballard | 524/143 |
| 4,460,728 | 7/1984 | Schmidt, Jr. et al. | 524/271 |
| 4,526,577 | 7/1985 | Schmidt, Jr. et al. | 604/366 |
| 4,816,306 | 3/1989 | Brady et al. | 428/36.92 |
| 4,874,804 | 10/1989 | Brady et al. | 524/100 |
| 4,939,202 | 7/1990 | Maletsky et al. | 524/528 |
| 5,149,741 | 9/1992 | Alper et al. | 525/95 |
| 5,331,033 | 7/1994 | Stauffer et al. | 524/275 |
| 5,356,963 | * 10/1994 | Kauffman et al. | 524/43 |
| 5,373,041 | * 12/1994 | Prejean | 524/143 |
| 5,534,575 | * 7/1996 | Foster et al. | 524/270 |

FOREIGN PATENT DOCUMENTS

| | | |
|---|---|---|
| 0 104 005 | 3/1984 | (EP) . |
| 0 547 798 | 11/1992 | (EP) . |
| WO 93/10734 | 6/1993 | (WO) . |

OTHER PUBLICATIONS

Copy of French Search Report dated Jan. 7, 1997.

International Preliminary Examination Report dated Sep. 4, 1997.

* cited by examiner

*Primary Examiner*—Nathan M. Nutter
(74) *Attorney, Agent, or Firm*—Smith, Gambrell & Russell, LLP

(57) ABSTRACT

The present invention relates to a pressure-sensitive hot-melt adhesive composition characterized in that it includes a) at least one ethylene-alkyl acrylate copolymer, b) a tackifying resin and c) optionally a diluent and/or a stabilizer and/or a wax. Such a composition may be employed advantageously in the field of hygiene, especially for the adhesive bonding of disposable nappies and of catamenial liners.

10 Claims, No Drawings

HOT-MELT PRESSURE-SENSITIVE ADHESIVE FOR HYGIENE APPLICATIONS

This application is the National Phase of International Patent Application PCT/FR96/01424, filed Sep. 13, 1996, which claims priority to French Patent Application 95.11252, filed Sep. 26, 1995, the entire contents of each are hereby incorporated by reference in their entirety and relied upon.

FIELD OF THE INVENTION

The present invention relates to a pressure-sensitive hot-melt adhesive composition, to its use in the field of hygiene and to the adhesively bonded articles thus obtained, especially disposable nappies or diapers and catamenial liners.

BACKGROUND OF THE INVENTION

Disposable nappies generally consist of an absorbent filler protected on its outer face by a liquidproof polyethylene film and covered internally with a film of nonwoven fabric, generally of polyethylene, which comes into contact with the skin and allows body fluids to flow towards the said filler. More elaborate nappies may, in addition, contain a leakproof barrier of polyolefinic nature and/or an elastic waistband.

The nappies are conventionally prepared by adhesively bonding the various constituents with the aid of hot-melt adhesives whose composition can vary depending on the chemical nature of the components to be assembled. Such adhesives are described, for example, in the documents which follow.

U.S. Pat. No. 4,526,577 proposes an adhesive including a block copolymer A-B-A (in which A denotes a nonelastomeric block, for example styrene, and B denotes butadiene or hydrogenated butadiene), a compatible tackifying resin, a plasticizing oil and a stabilizer and, optionally, a wax originating from petroleum.

U.S. Pat. No. 4,460,728 describes an adhesive based on an ethylene-vinyl acetate or alkyl acrylate copolymer, on atactic polypropylene and on a compatible tackifying resin, optionally in the presence of a plasticizing oil and/or of a wax originating from petroleum and/or of a stabilizer.

U.S. Pat. No. 4,939,202 proposes a moisture-resistant adhesive containing a propylene-based amorphous polymer, a propylene-based crystalline polymer and a petroleum resin containing hydrocarbons containing from 4 to 10 carbon atoms.

U.S. Pat. No. 4,149,741 employs a hot-metal adhesive including a styrene-isoprene-styrene block copolymer, a compatible tackifying resin, a plasticizing oil and a stabilizer and, optionally, a wax derived from petroleum.

Catamenial liners, for their part, generally include an absorbent filler of the cellulose fluff or superabsorbent type and a covering based on a nonwoven fabric made of polypropylene or of viscose, to the outer face of which covering an adhesive composition is applied allowing positioning on the undergarment. To manufacture such liners the compositions described in the following documents have been proposed.

EP 0104005-A proposes an adhesive based on a viscoelastic elastomer of A-B-A type (in which B denotes a polyolefin, for example an ethylene-butylene copolymer and A includes a polystyrene), and on a tackifying resin.

Finally, in WO 93/10734 a composition is described including a copolymer of formula $(A-B)_n-Y$ (in which Y is a multivalent coupling agent, A is a vinyl monomer substituted by an aromatic radical and B is polybutadiene), a compatible tackifying resin and a plasticizing oil.

The adhesives of the prior art which have just been mentioned are not entirely satisfactory in the field of hygiene.

Thus, in the case of disposable nappies, the polypropylene-based hot-melt adhesives (U.S. Pat. No. 4,460,728 and U.S. Pat. No. 4,939,202) are difficult to use in conventional devices operating by fiberizing or spraying, and the compositions described in U.S. Pat. No. 4,526,577 and U.S. Pat. No. 5,149,741 exhibit poor behaviour towards water, which can result in particular in the separation of the absorbent filler adjoining the leakproof film.

In the case of catamenial liners the abovementioned adhesive compositions are found to be satisfactory when applied to a covering made of nonwoven fabric. However, it is found that the said compositions are not suited for the preparation of latest-generation ultrafine liners which comprise a covering consisting of a polyethylene-based open-worked or perforated film. It is found, in fact, that the use of compositions based on ethylene-vinyl acetate copolymer results in soiling of the covering and that the adhesives according to EP 0 104 005-A and WO 93/10734 must be applied at an elevated temperature, of the order of 150 to 180° C., in order to adhere to the support in a satisfactory manner.

DESCRIPTION OF THE INVENTION

New pressure-sensitive thermoplastic adhesive compositions have now been found which do not exhibit the abovementioned disadvantages, these compositions being characterized in that they include a) at least one ethylene-alkyl acrylate copolymer b) a tackifying resin c) optionally a diluent and/or a stabilizer and/or a wax.

The ethylene-alkyl acrylate copolymer according to the invention is generally chosen from copolymers containing from 15 to 45% and preferably 25 to 35% by weight of alkyl acrylate.

The alkyl acrylate is advantageously chosen from methyl acrylate, butyl acrylate and 2-ethylhexyl acrylate. Butyl acrylate is preferably employed.

Such copolymers which exhibit a melt index of between 0.5 and 1000 and preferably 2 and 500 are generally employed.

Among the abovementioned copolymer mixtures which can be employed it is possible to mention very particularly the mixtures based on copolymer exhibiting an acrylate content of between 15 and 40%, preferably 30 and 35, and a melt index of between 500 and 2, preferably 320 and 2.

The tackifying resin according to the invention is chosen from the group consisting of solid or liquid hydrocarbon resins such as the unhydrogenated or completely or partially hydrogenated aliphatic or aromatic resins, for example ESCOREZ 5300 form Exxon and IMARV S 100 S form Idemitzu, resins based on natural or modified, for example polymerized, rosin esters, especially pentaerythritol or glycerol esters, for example UNITAC R 100 L form Union-Camp, polyterpene or modified polyterpene resins, for example WINGTACK from Goodyear and "-methylstyrene resins, for example URATACK 68520 from DSM.

The diluent according to the invention is chosen from aliphatic or naphthenic oils, plasticizers such as phthalates, adipates and benzoates, oligomeric or polymeric olefins of low molecular weight, polypropylene, polybutene and hydrogenated polyisoprene.

The wax according to the invention is generally chosen from waxes of petroleum origin or from Fischer Tropsch synthesis.

The stabilizer according to the invention is generally chosen from antioxidants such as substituted phenols, for example IRGANOX 1076 from Ciba-Geigy and phosphites.

The pressure-sensitive hot-melt adhesive composition in accordance with the invention generally includes from 20 to 50% by weight, and preferably 30 to 40%, of ethylene-alkyl acrylate copolymer, from 30 to 80% by weight, and preferably 40 to 60%, of tackifying resin, from 0 to 35% by weight, and preferably 10 to 25%, of diluent, from 0 to 1.5% by weight of stabilizer and from 0 to 15% by weight of wax.

Compositions according to the invention advantageously exhibit a viscosity of between 1000 and 10,000 mPa s (Brookfield viscometer—temperature 150–170° C.).

The compositions in accordance with the invention are generally obtained by mixing at a temperature which varies from 120 to 170° C.

The compositions thus obtained exhibit good adhesive to polyolefinic supports such as films and nonwoven fabrics made of polyethylene or polypropylene, good cohesion and good water resistance. In addition, these compositions can be processed very easily according to the techniques in the field of hygiene, in particular by coating, fiberizing, spraying or control-coating.

The pressure-sensitive hot-melt adhesive compositions according to the invention are particularly recommended for the manufacture of articles related to the field of hygiene, especially of disposable nappies and of catamenial liners, which articles also constitute a subject-matter of the invention. These compositions are advantageously used to manufacture nappies comprising one or more elastic or non-elastic synthetic films of varied nature, for example such as those used to obtain an elastic waistband. They can, in addition, be used to stabilize and fix the absorbent filler, which is generally based on cellulose wool ("fluff").

EXAMPLES

The examples which follow make it possible to illustrate the invention. Examples 1 to 8 and 12 relate to disposable nappies and Examples 9 to 11 concern catamenial liners.

Example 1

Into a mixer maintained at 130° C. are added 103 g of dioctyl phthalate, 400 g of ethylene-butyl acrylate copolymer (Lotry® 35 BA 320; butyl acrylate: 35%; melt index: 320; Elf Atochem S.A. ), 490 g of tackifying resin ESCOREZ 6372; Exxon) and 0.7 g of antioxidant (IRGANOX 1010; Ciba-Geigy). After complete homogenization a hot-melt composition is obtained exhibiting a Brookfield viscosity of 4500 mPa s at 150° C.

The composition thus obtained is deposited by fiberizing on a polyethylene film at a rate of 10 g/m². The lining is performed, on the one hand, on a nonwoven fabric made of polypropylene and, on the other hand, on a polyethylene film.

The measurements obtained after application of the 180° peel test at 200 mm/min are 4 N/25 mm and 4.4 N/25 mm in the case of the polyethylene/nonwoven and polyethylene/polyethylene materials respectively.

Example 2

The operation is carried out in the conditions of Example 1 in the presence of 65 g of polybutene (Napvis 10; BP), 300 g of ethylene-butyl acrylate copolymer (lotry® 35 BA 320; butyl acrylate: 35%; melt index: 320; Elf Atochem S.A.), 40 g of ethylene-butyl acrylate copolymer (Lotry® 30 BA 02; butyl acrylate: 30%; melt index: 2; Elf Atochem S.A.), 455 g of tackifying resin ESCOREZ 5320; Exxon), 45 g of wax (25 B; Total) and 5 g of stabilizer (IRGANOX 1010; Ciba-Geigy).

The adhesive thus obtained is deposited by coating onto a polyethylene film over a width of 25 mm at a rate of 5 g/m². The lining is performed in the conditions of Example 1.

The measurements obtained after application of the 180° peel test at 200 mm/min are 2.7 N/25 mm and 2.3 N/25 mm in the case of the polyethylene/nonwoven and polyethylene/polyethylene materials respectively.

Example 3 (Comparative)

The operation is carried out in the fiberizing conditions according to Example 1 in the presence of a hot-melt adhesive based on APAO (TH 706; CECA S.A.).

The composition thus obtained can be fiberized only in conditions where the temperature is higher than 170° C. and the air pressure is higher than 5 bar (5 H $10^5$ Pa).

Example 4

The operation is carried out in the fiberizing conditions according to Example 1 in the presence of the hot-melt adhesive of Example 2.

It is seen that the composition is completely fiberizable in the conditions of application (temperature: 140° C.; air pressure: 1.5 bar (1.5 H $10^5$ Pa)).

Example 5 (Comparative)

The procedure follows the coating conditions of Example 2, modified in that a hot-melt adhesive based on APAO (TH 706; CECA S.A.) is employed.

The measurements obtained after application of the 180° peel test at 200 mm/min are 2.5 N/25 mm and 2.1 N/25 mm in the case of the polyethylene/nonwoven and polyethylene/polyethylene materials respectively.

Example 6

The hot-melt adhesive according to Example 1 is applied to a polyethylene film at a rate of 5 g/m² and lamination onto a pad of fluff (cellulose wool) is performed.

The material thus obtained is soaked over an area of 20 cm H 20 cm with the aid of 100 ml of water. After 10 minutes the fluff is scratched manually. It is seen that the adhesive-coated area of the polyethylene remains covered with a film of fluff.

Examples 7 and 8 (Comparative)

The procedure follows the conditions of Example 6 in the presence of a rubber adhesive containing 25% by weight of styrene-butadiene-styrene (Example 7) or styrene-isoprene-styrene (Example 8) polymer, 55% by weight of petroleum resin and 20% by weight of naphthenic oil. It is seen that the adhesive-coated area of the polyethylene does not remain covered with a film of fluff after scratching.

Example 9

150 g of naphthenic oil (NYTEX 820; Nynas) are introduced into a mixer which is heated to 130° C. The following are added: 220 g of ethylene-butyl acrylate copolymer (lotry® 35 BA 320; butyl acrylate: 35%; melt index: 320; Elf Atochem S.A.), 60 g of ethylene-butyl acrylate copolymer (lotry® 30 BA 02; butyl acrylate: 30%; melt index: 2; Elf Atochem S.A.), 348 g of resin (ECR 395; Exxon), 100 g of tackifying resin (OULUPALE B 100; Forchem), 120 g of tackifying resin (URATACK 69540; DSM) and 0.2 g of stabilizer (IRGANOX 1010; Ciba-Geigy).

The composition thus obtained, which exhibits a viscosity of 3470 mPa s at 150° C., is applied by coating at 130° C. onto silicone-treated paper (25 mm width) and transferred onto a polyethylene film.

The adhesiveness, measured according to NF standard Q 34013, is 2.0 N/25 mm.

No soiling is seen on the support.

Examples 10 and 11 (Comparative)

The conditions of Example 9 are followed in the presence of an adhesive, on the one hand, based on ethylene-vinyl acetate copolymer (XT 7117; CECA S.A.) and, on the other hand, based on styrene-butadiene-styrene copolymer (TH 712; CECA S.A.), the latter being applied at 160° C. (limiting temperature for the coating).

The adhesiveness is equal to 1.7 N/25 mm and 2.0 N/25 mm respectively.

Traces of soiling are seen on the support with the XT 7117 adhesive (Example 10).

A deterioration of the support is seen in the presence of the TH 712 adhesive (Example 11), due to the high application temperature.

Example 12

The process is performed under the conditions of Example 1 modified in that an ethylene/methyl acrylate copolymer (Lotryl® 28 MA 175; 28% methyl acrylate; melt index 175; Elf Atochem S.A.) is used.

After homogenization, a self-adhesive hot-melt composition is obtained. This composition is deposited by fiberizing according to the method of Example 1, the lining being performed on a nonwoven fabric made of polypropylene.

The measurement obtained after applying the 180° peel test at 200 mm/min is equal to 3.5 N/25 mm.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Pressure-sensitive hot-melt adhesive composition comprising:
   a) at least one ethylene-alkyl acrylate copolymer,
   b) a tackifying resin,
   c) optionally a diluent, a stabilizer, or a wax and mixture thereof,
   wherein said adhesive composition is capable of being used in fiberizing or spraying devices,
   wherein said adhesive composition can be coated onto a support at a temperature less than 150° C., and
   wherein said adhesive composition does not soil said support when said adhesive composition is coated onto said support.

2. Composition according to claim 1, wherein the ethylene-alkyl acrylate copolymer contains from 15 to 45% by weight of alkyl acrylate.

3. Composition according to claim 1, wherein the alkyl acrylate is selected from methyl acrylate, butyl acrylate and 2-ethylhexyl acrylate.

4. Composition according to claim 1, wherein the copolymer exhibits a melt index of between 0.5 and 1000.

5. Composition according to claim 1, wherein it exhibits a viscosity of between 1000 and 10,000 mPa s at temperatures from 150 to 170° C.

6. Composition according to claim 1, wherein it includes:
   from 20 to 50% by weight of ethylene-alkyl acrylate copolymer,
   from 30 to 80% by weight of tackifying resin,
   from 0 to 35% by weight of diluent,
   from 0 to 1.5% by weight of stabilizer,
   and from 0 to 15% by weight of wax.

7. Method for manufacture of articles intended for hygiene, containing at least one polyolefinic support comprising preparing said articles by adhesively bonding constituents of said articles with a composition,
   wherein said composition is a pressure-sensitive hot-melt adhesive composition comprising:
   a) at least one ethylene-alkyl acrylate copolymer,
   b) a tackifying resin, and
   c) optionally a diluent, a stabilizer, or a wax and mixtures thereof,
   wherein said adhesive composition is capable of being used in fiberizing or spraying devices,
   wherein said adhesive composition can be coated onto a support at a temperature less than 150° C., and
   wherein said adhesive composition does not soil said support when said adhesive composition is coated onto said support.

8. Method according to claim 7, wherein the articles are disposable diapers or catamenial liners.

9. Disposable diaper enclosing a composition,
   wherein said composition is a pressure-sensitive hot-metal adhesive composition comprising:
   a) at least one ethylene-alkyl acrylate copolymer,
   b) a tackifying resin, and
   c) optionally a diluent, a stabilizer, or a wax and mixtures thereof,
   wherein said adhesive composition is capable of being used in fiberizing or spraying devices,
   wherein said adhesive composition can be coated onto a support at a temperature less than 150° C., and
   wherein said adhesive composition does not soil said support when said adhesive composition is coated onto said support.

10. Catamenial liner enclosing a composition,
    wherein said composition is a pressure-sensitive hot-melt adhesive composition comprising:
    a) at least one ethylene-alkyl acrylate copolymer,
    b) a tackifying resin, and
    c) optionally a diluent, a stabilizer, or a wax and mixtures thereof.

* * * * *